United States Patent
Abo

(10) Patent No.: US 7,582,322 B2
(45) Date of Patent: Sep. 1, 2009

(54) METHOD FOR PRODUCING GRANULATED BEAN PASTE, OR "MISO"

(75) Inventor: Kenji Abo, Aomori (JP)

(73) Assignee: Kanesa Co., Ltd., Homoir (JP)

(*) Notice: Subject to any disclaimer, the term of this patent is extended or adjusted under 35 U.S.C. 154(b) by 799 days.

(21) Appl. No.: 10/979,140

(22) Filed: Nov. 3, 2004

(65) Prior Publication Data
US 2005/0095335 A1 May 5, 2005

(30) Foreign Application Priority Data
Nov. 5, 2003 (JP) .............................. 2003-375864

(51) Int. Cl.
*A23L 1/202* (2006.01)
(52) U.S. Cl. .................. 426/459; 426/46; 426/448; 426/476; 426/516; 426/517; 426/518; 426/524; 426/634; 426/418; 426/519
(58) Field of Classification Search .............. 426/516, 426/517, 518, 448, 459, 473.46, 524, 634, 426/418, 519; 99/443 C, 467–469
See application file for complete search history.

(56) References Cited

U.S. PATENT DOCUMENTS 3,290,155 A * 12/1966 Griffin, Jr. et al. .......... 426/454
3,937,844 A * 2/1976 Koyama ...................... 426/46
4,177,574 A 12/1979 Harashima
4,251,558 A * 2/1981 Kobayashi et al. .......... 426/473
4,897,529 A * 1/1990 Haga et al. .................. 219/534
4,999,203 A * 3/1991 Fukuyasu et al. ............. 426/46
5,125,168 A * 6/1992 Aigeldinger ................. 34/92

FOREIGN PATENT DOCUMENTS

JP        3151423       6/1991
JP       11075755   *  3/1999

OTHER PUBLICATIONS

Human translation JP 11075755 Mar. 1999.*

* cited by examiner

*Primary Examiner*—Drew E Becker
*Assistant Examiner*—Steven Leff
(74) *Attorney, Agent, or Firm*—Browdy and Neimark P.L.L.C.

(57) ABSTRACT

Granulated bean paste or "miso" is made by partially drying uncooked bean paste by vacuum freeze drying, thoroughly mixing and then storing the semi-dried bean paste in an isothermal chamber at a substantially consistent temperature within the range of 15° C. to 20° C. for a few days to homogenize the water content in the semi-dried bean paste, then extruding the semi-dried bean paste into an elongated form, and finally cutting and breaking the bean past material to obtain fine particles of granulated bean paste.

4 Claims, 3 Drawing Sheets

METHOD FOR PRODUCING GRANULATED BEAN PASTE, OR "MISO"

BACKGROUND OF THE INVENTION a) Field of the Invention

This invention is concerned with a method for producing granulated bean paste (or "miso"), with use of uncooked bean paste as the starting material, which is granulated into small particles, and then dried to have an appropriate hardness to enable it to maintain its form as shaped.

b) Description of Prior Arts

As the prior art for the method of manufacturing such granulated bean paste (or bean paste in granular form), which is prepared from uncooked bean paste, as the starting material, which is formed into granular shape and subjected to desiccation, there is Japanese Patent specification No. 3,151,423.

This method according to the published patent comprises the following steps, that is:

a first step of subjecting the raw material "miso", prepared by mixing it with seasoning, to a preliminary drying in a vacuum freeze-drying apparatus to render the material to have a low moisture content of an order of 20%, approximately corresponding to the plastic limit of the material to enable it to be extrusion-molded by means of an extrusion-type pelletizer (or granulator);

a second step of breaking and kneading this material bean paste, which has been subjected to preliminary drying to the semi-dried state, by means of an agitator, and then placing the same in a refrigerator for several days to secure homogeneity and uniformity of the water content therein; and a third step of extruding this semi-dried bean paste (or "miso"), which has been subjected to the homogeneity and uniformity treatment of the water content, is extruded by and through the extrusion-type pelletizer into a space of the vacuum chamber maintained at its degree of vacuum of an order of several hundreds pascals (Pa), in the form of a thin cord of 2 to 4 mm in diameter, while subjecting the extruded material to the vacuum desiccation due to the moisture content decrease on account of abrupt cooling accompanied by the vacuum evaporation of the water content under the vacuum, the shaped product in the cord shape is severed and broken into the granular form by means of a cutting knife disposed within the vacuum chamber, thereby forming the extruded product into the granular form with appropriate hardness to maintain its form as shaped, with further step of subjecting the granular product depending on necessity, to breaking for its second desiccation until it attains a desired moisture content.

This prior art method, however, has its inherent problem such that, when the granular bean paste product is to be made, the resulted granular bean paste contains therein agglomerations in irregular shape which have been generated at a considerable ratio. Removal of such particles of irregular shape contained therein, for the adjustment of the particle size, would inevitably affect the rate of yield of the product, and lower the efficiency in the extrusion-molding.

Occurrence of such irregular-shaped particles to be produced at the time of the pelletization is ascribable to the facts that the water content in this raw material bean paste is lessened to its low moisture content to the order of its plastic limit in the vacuum desiccation at the first step; and that, when the semi-dried bean paste containing therein its water content, which has been rendered homogeneous and uniform at the second step, is shaped in cord-form by the extrusion-pelletizer at the third step, this semi-dried bean paste has, in some of its portions, much more content of water than the water content for its plastic limit. As the consequence, the shaped products in cord-form mutually adhere at the exit part of the extrusion-pelletizer, or become sticked to the exit orifice of the extrusion-pelletizer and coagulated. Such is due to the fact that the water content in this semi-dried bean paste is insufficiently homogeneous and uniform.

On the other hand, the poor efficiency in the extrusion molding is due to the fact that the semi-dried bean paste contains therein a portion, wherein the desiccation has progressed with less moisture content than that for the plastic limit, which causes clogging of the extrusion orifice of the extrusion-pelletizer to result in its obturation. This is also ascribable to the insufficient homogeneity and uniformity in water content of the semi-dried bean paste at the second step.

In order for the semi-dried bean paste to have its uniform water content of upto and including the level of the order of its plastic limit, there is no choice but to refine the entire bean paste material by leaving it in nature so as to have those portions within the material, with the irregular values of its water content matured by storing these semi-dried bean paste material in blocks.

In order to prevent this bean paste material from decomposition which occurs and progresses during its storage, it is indispensable to store this semi-dried bean paste material in a refrigerated condition for a certain period of time. Therefore, the second step of refrigeration in storage in the conventional expedient has its intended merit.

By the way, while it is assumed possible to solve those problems, wherein unconformed particles of the bean paste material would yield during the pelletization, and wherein efficiency in pelletizing becomes poor due to obturation of the extrusion orifice of the extrusion-granulator, can be solved by subjecting the raw bean paste (or "miso") to a semi-dried state which is slightly lower than the moisture content of an order of approximately its plastic limit, and extruding the raw material by the extrusion-granulator at an increased pressure for the extrusion. In so doing, however, it has been discovered that there derives a separate problem of segregation phenomenon of the oil content in the shaped product as extruded to deteriorate the quality of the resulted product (vide: Japanese Patent specification No. 3,151,423).

SUMMARY OF THE INVENTION

It is therefore the primary object of the present invention to solve the difficult problem inherent in the conventional method of producing bean paste. That is to say, when the bean paste material is subjected to semi-drying process to its low moisture content to enable it to be plasticizable, by performing extrusion of the raw bean paste material into the vacuum space, in its cord or string form, which is maintained at its vacuum degree of several hundred pascals (Pa) or below, by means of the extrusion-granulator, it was found difficult to realize sufficient homogenization and uniformity of the water content in the semi-dried bean paste material to adjust irregularities therein, without causing qualitative deterioration of the semi-dried bean paste material.

According to the present invention, there is provided a method for producing granulated bean paste (or "miso") which comprises: a first step of charging bean paste material prepared by mixing uncooked bean paste, condiments, and so forth, into a vacuum freeze-drying apparatus to subject the starting material to its semi-drying state of low moisture content of about 20% or so corresponding to its plastic limit; a second step of mixing under agitation of this semi-dried bean paste material by means of an agitator, followed by placing the same in a warming chamber maintained at a temperature of from 15° C. to 20° C. for several days to homogenize the water content; and a third step of extruding the semi-dried bean paste with homogenized water content into an extrusion chamber maintained at its degree of vacuum of an order of several hundred pascals (Pa), in the shape of cord or string, by means of a granulator, followed by cutting and breaking the shaped product, by use of a cutting knife disposed in the extrusion chamber and rotating at a high speed.

According to the present invention, in another aspect thereof, there is provided a method for producing granulated bean paste, wherein a multi-staged belt conveyor to receive and hold thereon the semi-dried bean paste material which is extruded into the extrusion chamber connected to the extrusion side of the extrusion-granulator for the semi-dried bean paste material in the form of cord or string, and maintained at its vacuum degree of an order of several hundred pascals (Pa), followed by cutting and breaking the shaped article, by use of a cutting knife disposed in the extrusion chamber, and rotating at a high speed.

The expedient according to the present invention is for rectifying the irregularities in the water content of the semi-dried bean paste material, the moisture content of which has been reduced to an order of its plastic limit at the first process step of the abovementioned conventional expedient. To attain this purpose, the cold storage of the semi-dried bean paste, which has heretofore been performed at the second step is abolished, and instead this cold storage is changed to warm storage in a isothermal chamber maintained at a constant, and comparatively high inner temperature ranging from 15° C. to 20° C.

In more detail, when this uncooked bean paste material is desiccated to its moisture content of an order of its plastic limit by means of a freeze-drying apparatus, and the semi-dried bean paste obtained from its mixing under agitation was subjected to test and examination for its cold storage to control the irregularities in its moisture content to be homogeneous and uniform, and then subjected the bean paste material to various experiments by changing the temperature during its storing, it has been discovered that the homogeneity and uniformity in the moisture content of the bean paste material during its storing was found to have attained its perfect level of 100% homogeneity owing to its storing in the isothermal chamber maintained at 25° C. in its inside temperature for a period of about one and half a day, as shown in the graphical representation in FIG. 6; further, when the bean paste material is stored in the warming chamber maintained at a temperature level of from 15° C. to 16° C., it has been found that the perfect homogeneity level of 100% homogeneity was attained in a period of about two and half a day period; furthermore, when the inside temperature of the storage chamber was lowered to an order of 10° C. to 12° C., it was discovered that an unhomogenized portion remained in the bean paste material at a rate of 10% or so, even after lapse of three days in its storage. Additional discovery was obtained such that, when the temperature condition of the warming chamber inside was lowered to about 2° C. to 5° C. or so, there still remained the unhomogenized portion in the bean paste material at a ratio of 20 to 30% or so.

In this case, studies were made as to the relationship between the temperature and the coloring phenomenon to occur in the bean paste material during its storage. The results were as shown in the graphical representation in FIG. 7: that is to say, when the temperature in the chamber was maintained at 2° C. for storing the bean paste material under the cooling condition, the material was kept in its state of substantially no coloring phenomenon having come into view, even after passage of 4 days for its storage period; when the temperature in the chamber was maintained at 15° C. for storing the bean paste material under the warming condition, the material indicated its coloring phenomenon at a few percentage of its ratio, after passage of 4 days for its storage period; when the temperature in the chamber was maintained at 15° C. for storing the bean paste material under the isothermal condition, there appeared an increase of about 5% in the degree of coloring of the bean paste material; and, when the temperature in the chamber was maintained at 30° C. for storing the bean paste material under the isothermal condition, the ratio of coloring of the bean paste material abruptly proceeded to indicate an increase in the coloring of the material of an order of approximately 20% after lapse of four days.

This test result indicates that storage of the semi-dried bean paste material to render its moisture content to be homogeneous and uniform is substantially complete for a span of a few days by maintaining the temperature within the isothermal chamber at a level of 15° C. or slightly higher than that. In this case, if and when the temperature within the isothermal chamber is established at a temperature level of 15° C. or lower, the progress in discoloration of the bean paste material during its storage, due to deterioration of the bean paste material can be restrained to a range which does not bring about any effect to the quality of the resulting product.

From the abovementioned test results, it has been found out that the cold storage (or refrigeration) of this semi-dried bean paste for its intended purpose of homogeneity and uniformity of its water content was not adequate for the perfect homogeneity of its water content, but the isothermal storage in a isothermal chamber maintained at a temperature range of from 15° C. to 25° C. for two to three days was adequate.

Since the method for producing granulated bean paste according to the expedient of the present invention is realized by utilizing the isothermal chamber for homogenizing the moisture content in the bean paste material which has been semi-dried to its moisture content of an order of its plastic limit, with the inner temperature of the isothermal chamber being established in a range of from 15° C. to 20° C., and with the number of days for storage being set from two to three days, the water content in this semi-dried bean paste (or "miso") can be homogenized almost perfectly, without causing deterioration of its quality. As the consequence, at the time of granulating the bean paste material by means of the extrusion-granulator, there is no possibility of the shaped product being extruded in the string (or cord) form, adhered together in an irregular shape or in a lump shape due to adhesion among the shaped products in cord form, whereby, when the bean paste material as granulated is to be adjusted to the final "miso" product in granulated form, the mixing ratio of the grains in irregular shape is found to have reduced to 1% or below of a remarkably good yield, in comparison with the mixing ratio of an order of 5% which was usually existent in the product obtained in the conventional expedient, hence the granulated bean paste or "granulated miso" can be obtained with high efficiency, thanks to the extrusion orifice of the extrusion-granulation machine being free from obstruction.

The foregoing objects, other objects, as well as the specific construction and function of the method for producing the granulated bean paste according to the present invention will become more apparent and understandable from the following detailed description thereof, when read in conjunction with the accompanying drawing.

BRIEF DESCRIPTION OF THE ACCOMPANYING DRAWING

FIGS. 1 to 5 are schematic illustrations showing an apparatus to be used for the practice of producing the granulated bean paste in accordance with the method of the present invention, wherein:

FIG. 1 is a developed view, partly in broken state, showing a vacuum freeze-dryer, to be provided in the granulated bean paste production apparatus;

FIG. 2 is a schematic longitudinal side elevational view of the agitator for the apparatus as shown in the abovementioned FIG. 1;

FIG. 3 is an outline sectional view of the warming storage chamber for the granulated bean paste production apparatus according to the present invention;

FIG. 4 is a longitudinal cross-sectional side elevational view of an extrusion-granulator for the granulated bean paste production apparatus according to the present invention;

FIG. 5 is a longitudinal cross-sectional side elevational view showing an overall construction of a vacuum agitation dryer for finishing the bean paste or "miso" product in the granulated bean paste production apparatus;

DETAILED DESCRIPTION OF THE PREFERRED EMBODIMENTS

In the following, the present invention will be described in detail in reference to a preferred embodiment thereof.

Figure 1:
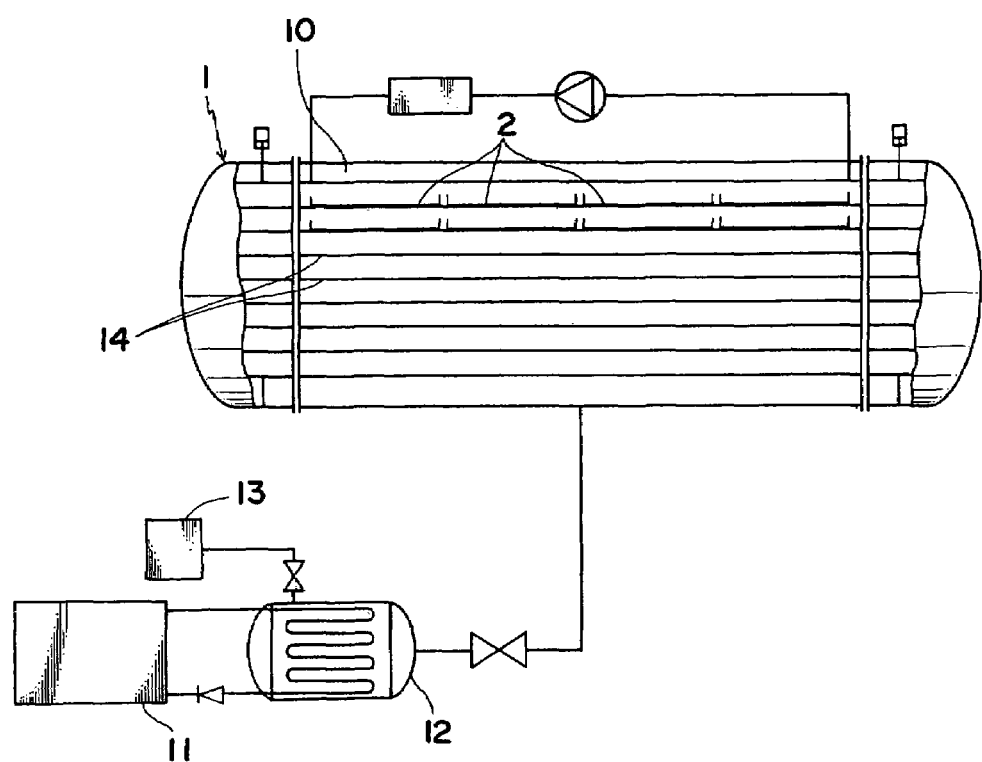
Figure 3:
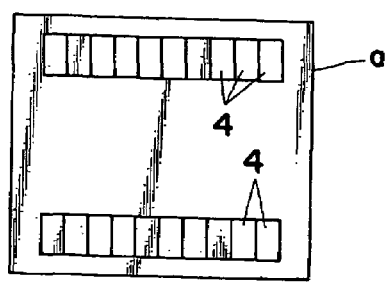

The freeze-drying apparatus 1 shown in FIG. 1 is of an ordinary type, which is maintained, in the interior of its drying chamber 10, to its vacuum degree of several hundred pascals (Pa) or lower by means of a refrigerator 11, a trap 12, a vacuum pump 13, and others. Within this drying chamber 10, there are installed compartment trays 14 in multiple stages, together with an opening-closing door (not shown in the drawing). A material to be desiccated is charged in the individual trays (or any appropriate vessels) 2. After these trays 2 are placed on the compartment tray 14 by opening the door, which is then closed, interior of the drying chamber 10 is maintained at a predetermined degree of vacuum, and then heat of evaporation is fed by supplying the circulating heat medium into the compartment trays 14, thereby subjecting the material to vacuum-drying.

Figure 2:
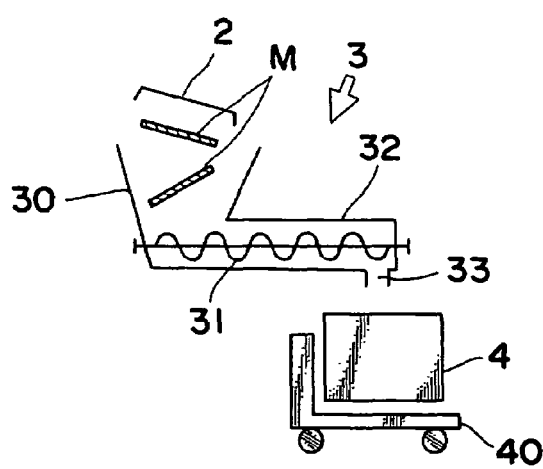

The agitator 3 shown in FIG. 2 is for mixing, under agitation, the material which has been desiccated to a predetermined moisture content by means of the abovementioned freeze-drying apparatus. This agitator 3 is constructed with a hopper 30 to receive therein the material to be desiccated, and a carrying cylinder 32 which stores therein a spiral type forwarding blade 31 and is connected to the bottom part of this hopper 30. With this construction of the agitator, the semi-dried bean paste material M which has been fed in and through the hopper 30 is advanced by rotation of the spiral type forwarding blade 31, under agitation, to let it out through an outlet port 33 provided in the lower surface side of the carrying cylinder 32 at its distal end. The bean paste material thus treated is received into a container 4 disposed below the outlet port 33, after which the container 4 is transported by a carrying truck 40.

The isothermal storage chamber "a" is for storing the bean paste material which has been dried to its predetermined moisture content by means of the agitator 3, and for homogenizing its water content. The device is a thermostatic chamber for maintaining the temperature of the chamber interior at a constant level of 15° C. to 20° C. or so, and is equipped with an inlet-outlet port and an opening-closing door to enable the bean paste material, which has been dried to its predetermined moisture content, as mentioned above, and filled in the container 4, to be transported for each truck 40 holding such container 4.

Figure 4:
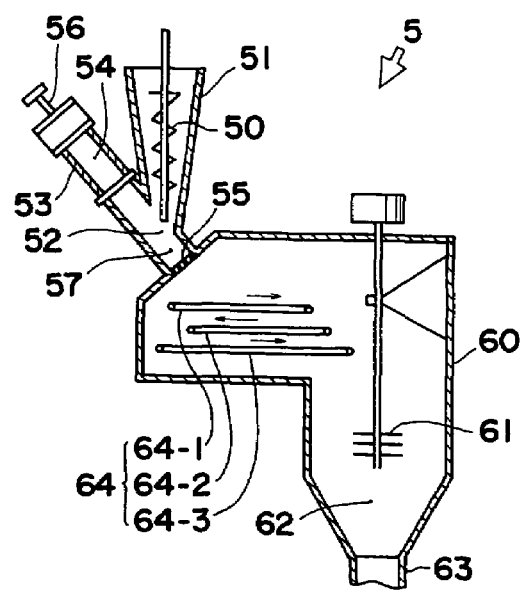

The extrusion-granulator 5, shown in FIG. 4, is constructed with a substantially upright hopper 51 for charging the bean paste material into the granulator; a spiral type forwarding blade 50 disposed within the hopper 51 in a manner to send the bean paste material for desiccation, as charged into the granulator, into and toward the lower opening 52 of the hopper 51; a cylinder 53 with its intermediate part in the axial direction with respect to the lower opening 52 of the hopper 51 being so inclined as to be connected at the upper peripheral surface side of the surrounding wall; a piston 54 fitted in a freely slidable manner on the upper end side of the cylinder 53 in a manner to push the material for desiccation, which is sent from the lower mouth 52 of the abovementioned hopper 51 into the cylinder 53, toward multi-perforated plate 55 disposed at the opening 57 to the downwardly inclined side of the cylinder 53; and an operating lever 56 to cause the piston 54 to reciprocate in the axial direction of the cylinder 53, the opening 57 at the lower end side of the cylinder 53 being connected to an extrusion chamber 60, the interior space of which is maintained at a predetermined degree of vacuum of an order of several hundred pascals (Pa).

Within this extrusion chamber 60, there are equipped a plurality of conveyors 64 (64-1, 64-2, 64-3, . . . ), each being made up of wire-mesh. The conveyors are arranged in parallel in the vertical direction, and in multiple stages so as to receive and hold thereon the material for desiccation, which is extruded from the extrusion orifice of the extrusion plate 55 by the extruding action exerted from the abovementioned piston 54. These parallelly arranged, multi-staged conveyors 64 are so disposed that their moving direction may be opposite each other alternately in accordance with the sequence of their parallel arrangement. That is to say, the extruded shaped material to be carried on and by the first conveyor 64-1 (on the top position) is carried over to the starting end side of the second conveyor 64-2, running in the transporting direction; the extruded shaped material to be discharged from the terminal end side of the second conveyor 64-2 is carried over to the starting end side of the third conveyor 64-3; and the extruded shaped material to be discharged from the terminal end side of the third conveyor 64-3 is fed to a cutting knife 61, which is disposed within the extrusion chamber 60 and is rotated at high speed, and is broken into fine grains. In this manner, while the shaped material, which is extruded and discharged into the extruding chamber 60 maintained at a predetermined degree of vacuum, is being transported sequentially on this multi-staged conveyor 64, it is subjected to the vacuum evaporation of water to a sufficient extent by its being exposed to the vacuum.

The degree of vacuum in this extruding chamber 60 can be maintained at a predetermined level by the anterior space of the multi-perforated plate 55 being tightly sealed by the bean paste material due to its being pushed to, and filled in, this multi-perforated plate 55 during the extruding operation by the piston 54, although the bean paste material to be dried is supplied to the abovementioned hopper 51 under the normal pressure.

The extrusion chamber 60 has a discharge port 62 in its bottom part which corresponds to a position beneath the abovementioned cutting knife 61 rotating at a high rotating speed. This discharge port 62 is connected to the vessel main body 70 of the vacuum agitator/dryer through a connecting pipe 63.

Figure 5:
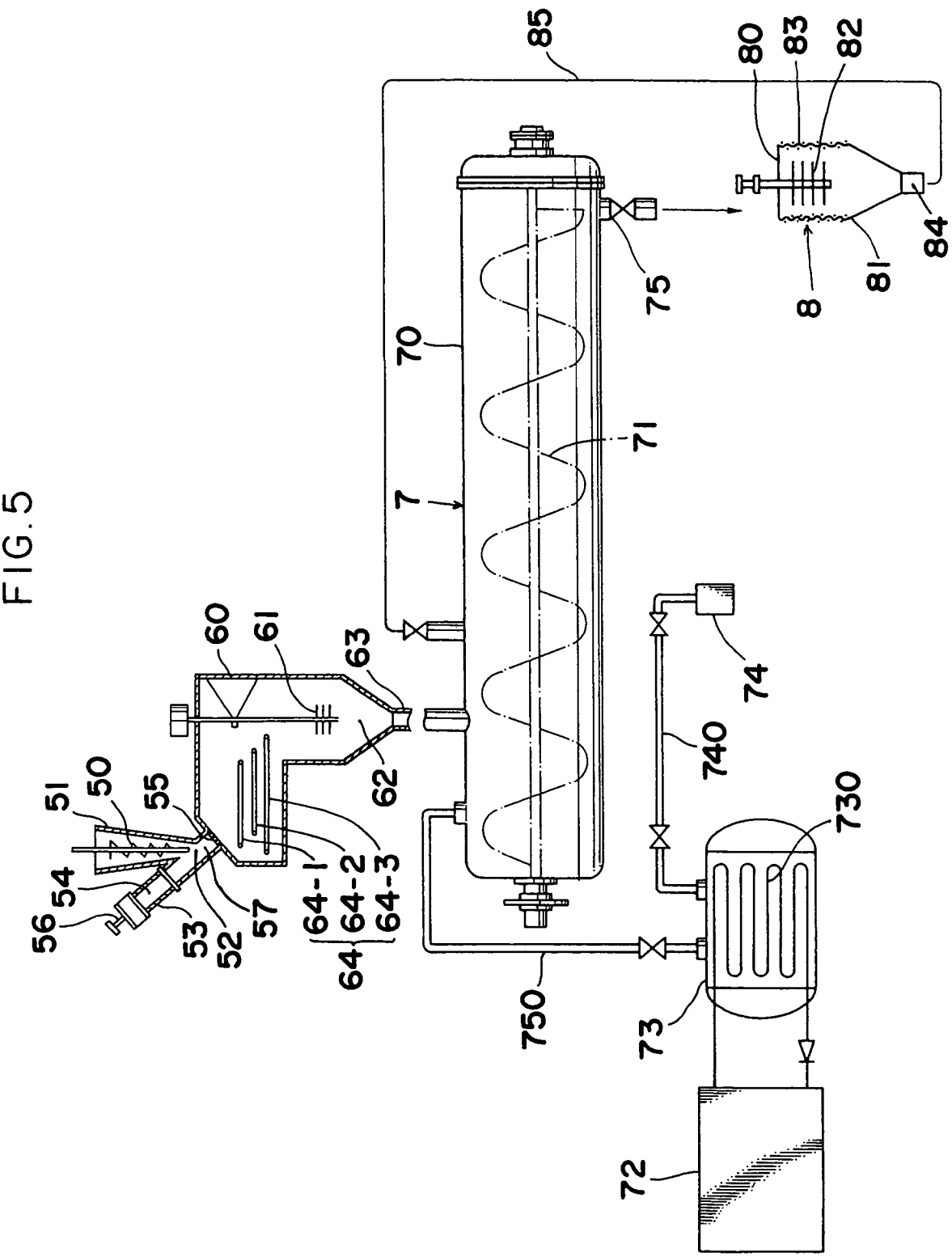

The vacuum agitator/dryer 7 as shown in FIG. 5 is of such a construction that a spiral type agitator and transporting blade 71 is provided in the interior of the vessel 70, which is formed in a long cylindrical shape along its axial direction, and is horizontally installed on the machine frame, so that the blade 71 may be able to transport the bean paste material for desiccation to be fed into the vessel 70 from one of the axial end side (left end side in the drawing) toward the other end side. The discharge port 62 formed in the bottom part of the extrusion chamber 60 of the extrusion-granulator 5 shown in FIG. 4 is connected to the upper surface side of one end side (left end side) of the vessel 70, while a take-out port 75 of the product is formed by way of a valve shutter. Also, a pipe line 750 is connected to one end side of the vessel 70 which is joined to a trap 73, wherein a snake tube 730 for circulating a cooling medium, which is cooled by a freezer 72 is accommodated. To this trap 73, there is connected a vacuum pump 74 through a pipe line 740, whereby air and vapor within the vessel 70 is extracted so as to maintain the vessel interior to a predetermined degree of vacuum.

A reference numeral 8 designates the cutting knife provided with a mesh, rotating at a high rotating speed, which is for adjusting the grain size of the product to be discharged from the discharge port 75 of the vessel 7. This high speed rotating cutter 8 axially supports the knife 82, which rotates at high speed, on the axial part of the body 81 in hopper shape, with the direction of its axial line as its up-and-down direction, which opens its upper surface side as a receiving port 80. The part of the peripheral wall of the body 81, corresponding to the outer periphery of the abovementioned knife 82 is formed in mesh 83, and then the product to be received from the receiving port 80 is broken by the cutting knife which is rotating at high speed to classify the product into fine grains passing through the mesh 82 and coarse grains which does not pass through the mesh, the latter (coarse grains) being returned to the vessel 70 through a transfer pipe 85.

Thus the method for producing the granulated bean paste begins with the first step of filling the tray 2 with the starting material for bean paste prepared by blending the raw (uncooked) bean paste and the seasoning, then the tray 2 is placed on the rack 14 within the drying chamber 10 of the vacuum freeze-drying apparatus 1, and, by the operation of the vacuum freeze-drying apparatus 1, the bean paste material is dried to its low moisture content of an order of its plastic limit, with a view to attaining a level of 20% as its moisture content.

The second step begins with removing the semi-dried bean paste material, which has been desiccated to an order of its plastic limit, from the desiccating chamber 10 of the vacuum freeze-dryer 1, followed by throwing the material into the agitator 3 to subject it to mixing under agitation so as to render the water content in every part of the material to be homogeneous.

This second step of homogenizing the moisture content in this semi-dried bean paste material is effected by first receiving the semi-dried bean paste material to be taken out of the outlet port 33 into the transporting vessel 4. Each vessel 4 is then charged into the isothermal chamber "a" maintained at a desired temperature level in a comparatively high temperature range in the vicinity of an ordinary temperature, where it is set at about 15° C. to 16° C. for warm storage of the material for two (2) to three (3) days.

Figure 6:
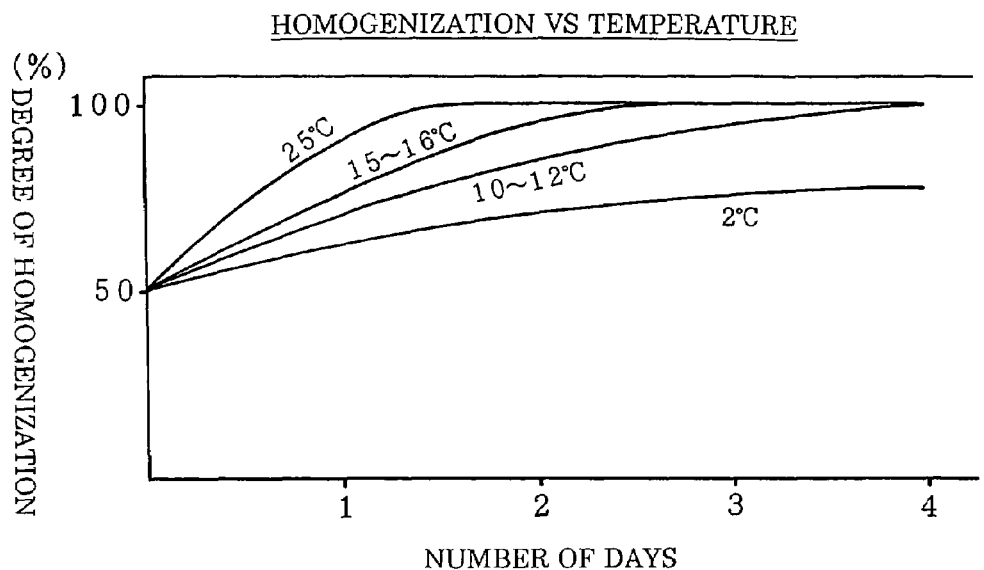
FIG. 6 is a graphical representation showing a relationship between temperature and homogenization of the water content, during storage of the semi-dried bean paste ("miso") material.
Figure 7:
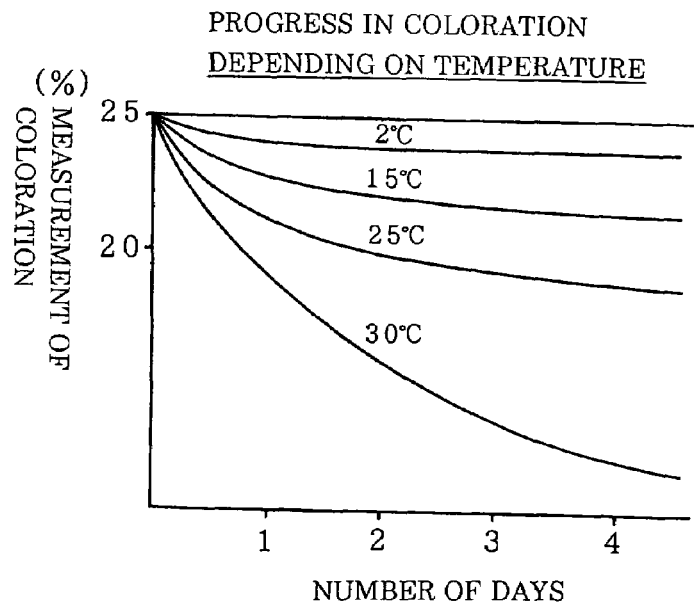
FIG. 7 is a graphical representation showing a relationship between storing temperature and coloration of the semi-dried bean paste material during its storage period.

At this time, if and when the temperature within the isothermal chamber "a" is set at 25° C. or over that level, as shown in FIG. 6, the homogenizing speed is increased, and, before two days of storing, the whole bean paste material can be brought to its homogenized water content. However, when the temperature exceeds the range of 15° C. to 16° C., the semi-dried bean paste material shows its remarkable coloration during its storage, bringing about remarkable influence on the quality of the material. Therefore, the temperature range for a safer value should desirably be set in a range of from 15° C. to 16° C. or around that figure.

In this second step, the semi-dried bean paste material, with its water content having been homogenized, is taken out of the isothermal chamber "a", and is then sequentially fed from the vessel 4 into the hopper 51 of the extrusion-granulator 5, followed by extruding operation of the piston 54 of the extrusion-granulator 5 to thereby force out the bean paste material in the form of cord or string, into the extrusion chamber 60 constructed in vacuum condition maintained at the degree of vacuum of several hundred pascals (Pa) or lower, through the extrusion orifice formed in the extrusion plate 55 of the extrusion granulator 5.

The bean paste material forced out in cord shape is then exposed to the vacuum atmosphere in the extruding chamber 60, and subjected to abrupt desiccation. At the same time, the bean paste material is severed and broken by the cutting knife 61 provided in the extrusion chamber 61, and rotating at a high rotating speed to reduce the material into finely divided grains, followed by taking it out of the outlet port 63 provided in the bottom part of the extruding chamber 60, thereby completing the third step.

In this third step, with a view to making more effective the desiccating action, due to the abrupt vacuum evaporation, of the shaped product of the semi-dried bean paste material which is extruded in the form of cord or string into the extruding chamber 60, it may be taken into consideration to provide a multi-stage type belt conveyor 64 made up of wire-mesh, as shown in FIG. 4, on which the extruded shaped product of the semi-dried bean paste material in cord shape is held. By the material being transported onto this multi-stage belt conveyor 64, the shaped product as subjected to the vacuum desiccation owing to the vacuum evaporation is supplied to the cutting blade 61 rotating at high speed to be appropriately broken and comminuted to fine grains.

The bean paste or "miso" in granular shape, which is formed in this third step and taken out of the outlet port, is in the form of granulated particles with the particle size thereof corresponding to the diameter of the extruding orifice formed in the extrusion plate 55 of the extrusion-type granulator 55. When the semi-dried bean paste material, which has been dried to its moisture content of the plastic limit, and which is homogenized its water content during the second step, is extruded into the extrusion chamber 60 through the orifice of the extrusion-granulator 5, the bean paste material becomes dried and hardened by both abrupt vacuum evaporation and cooling owing to its being exposed to the vacuum state within the extruding chamber 60 which is maintained in its degree of vacuum of several hundred pascals (Pa) or higher, on account of which it can be finished as the granulated bean paste product. Furthermore, this granulated bean paste product is sent into the vacuum agitator-cum-dryer directly connected to the vacuum chamber, in which the high speed rotating cutting blade is disposed, and the bean paste material is subjected to the vacuum desiccation for a predetermined period of time, after which the thus treated bean paste material is taken out of the vacuum chamber, and broken by the high speed rotating cutter 82 to be regulated to an appropriate grain size. This material is again sent into the vacuum drying chamber to effect its final desiccation for a predetermined time period, thereby obtaining the finished product of the granulated bean paste having its moisture content of 3% or lower.

Although the present invention has been described in detail with reference to the specific mode of embodiments as shown in the accompanying drawing, it should be understood that the invention is not limited to these embodiments alone, but any changes and modifications may be made within the spirit and scope of the invention as recited in the appended claims.

What is claimed is:

1. A method for producing granulated bean paste, comprising
    partially drying a starting material comprising a mixture of uncooked bean paste and seasoning, to provide a partially dried uncooked bean paste having a low moisture content of about 20%;
    effecting a first stage homogenization of the partially dried bean paste by agitation-blending of the partially dried bean paste;
    storing the agitation-blended partially dried bean paste in an isothermal warming chamber for a time and at a temperature sufficient to further homogenize the partially dried bean paste, at a substantially constant temperature within a range of 15° C. to 20° C. for two to three days to achieve a second stage homogenization of the partially dried bean paste;
    extruding the homogenized and partially dried bean paste as an elongated extrudate, into an extruding chamber and drying the elongated extrudate in the extruding chamber;
    cutting and breaking the dried elongated extrudate into granulated bean paste.

2. The method of claim 1 wherein the extrudate is extruded in the form of a cord or string by an extrusion granulator, and the extrudate is cut and broken into the granulated bean paste by a cutting knife disposed in the extruding chamber, rotating at a high rotating speed.

3. The method of claim 1 wherein the temperature in the isothermal warming chamber is maintained at about 15-16° C.

4. The method of claim 2 where the extruding is carried out by providing a multi-staged belt conveyor to receive, hold and convey the elongated extrudate to the cutting knife.

* * * * *